March 12, 1940.   C. L. EKSERGIAN   2,192,966
BRAKE CONTROL MECHANISM
Filed Dec. 14, 1935   4 Sheets-Sheet 1

INVENTOR.
CAROLUS L. EKSERGIAN.
BY
John P. Tarbox
ATTORNEY.

March 12, 1940.      C. L. EKSERGIAN      2,192,966
BRAKE CONTROL MECHANISM
Filed Dec. 14, 1935      4 Sheets-Sheet 2
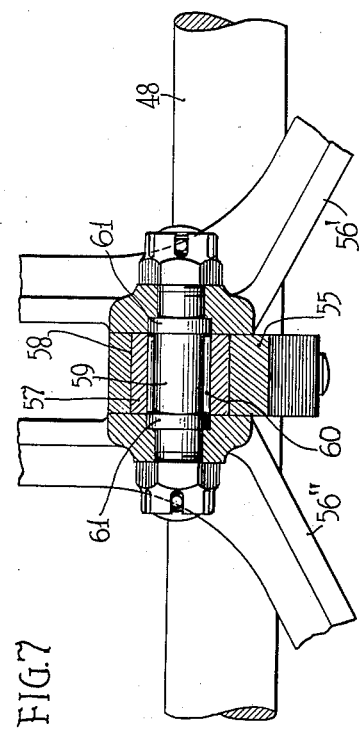
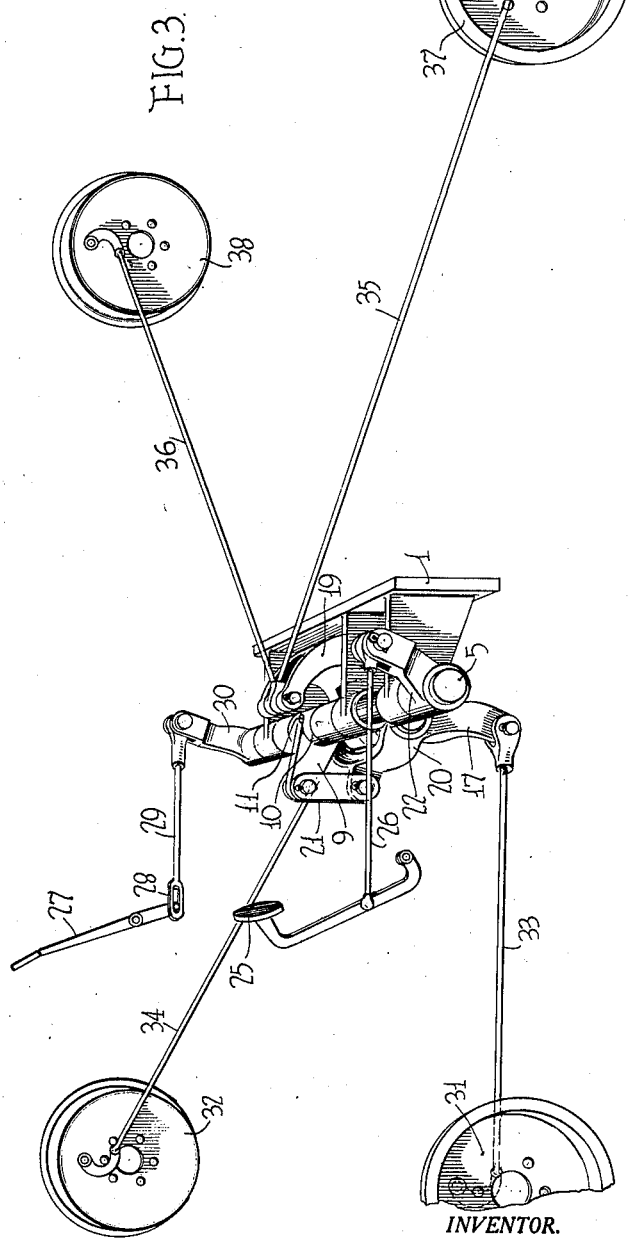
INVENTOR.
CAROLUS L. EKSERGIAN.
BY
John P. Tarbox
ATTORNEY.

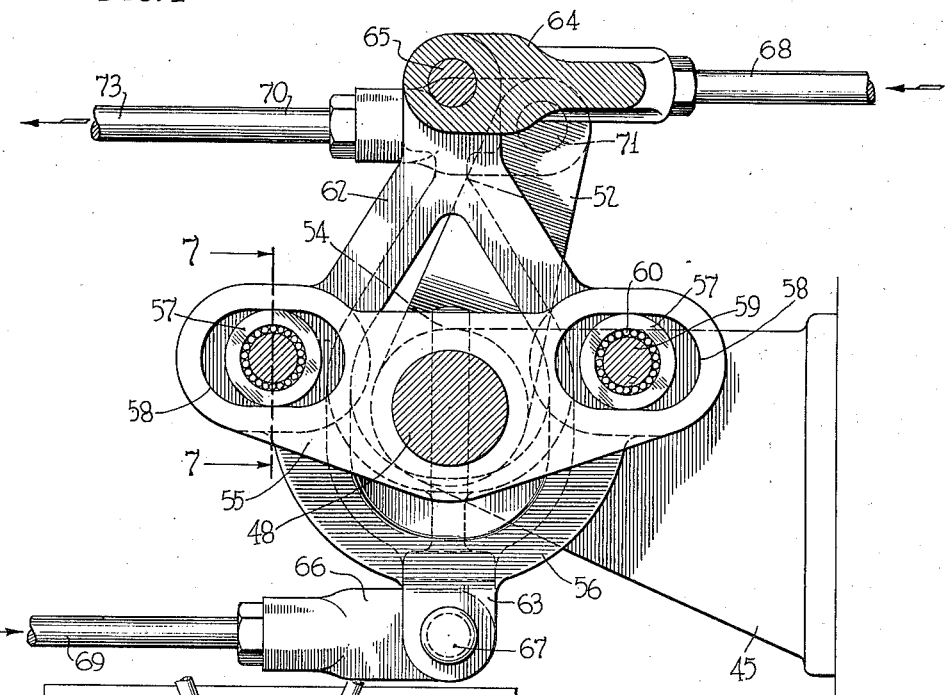
FIG.4.
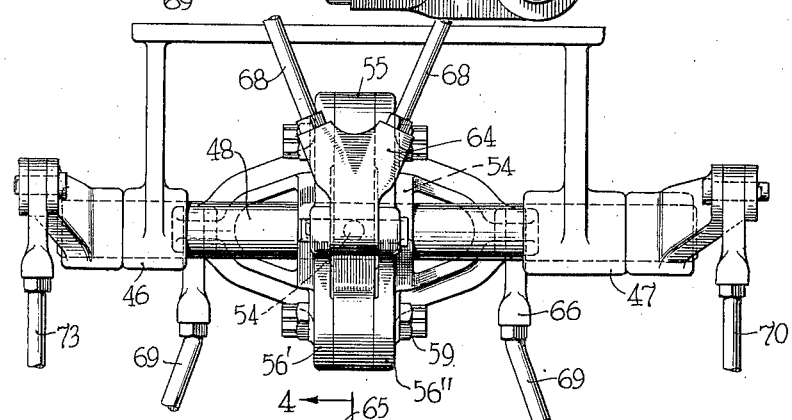
FIG.5
FIG.6
INVENTOR.
CAROLUS L. EKSERGIAN.
John P. Tarbox
ATTORNEY.

March 12, 1940.  C. L. EKSERGIAN  2,192,966
BRAKE CONTROL MECHANISM
Filed Dec. 14, 1935  4 Sheets-Sheet 4
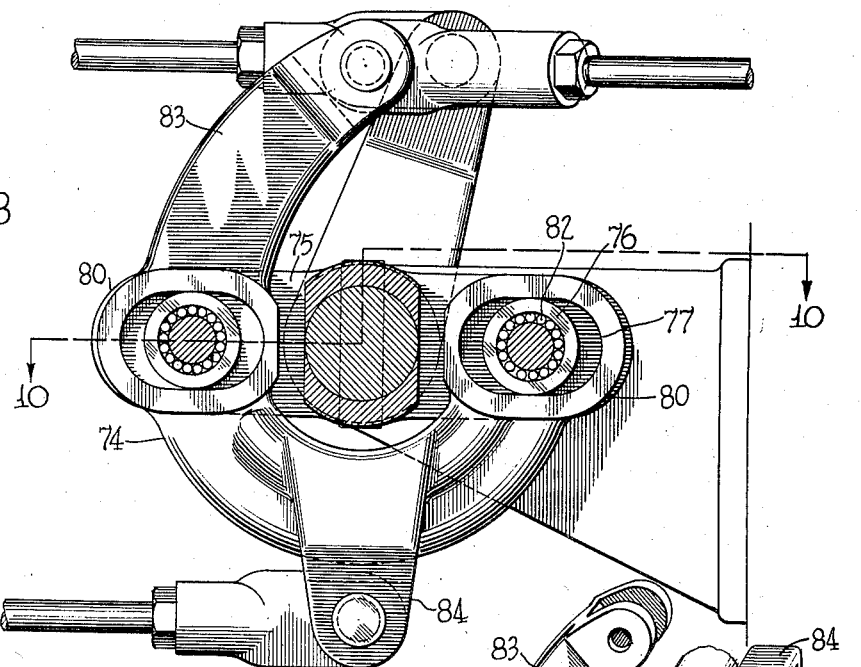
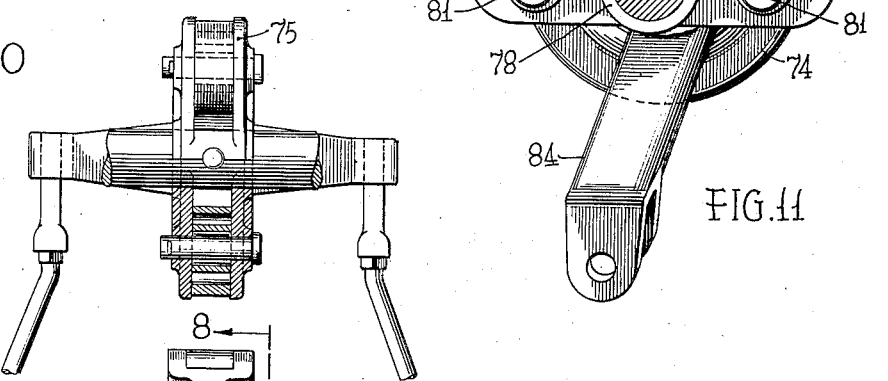
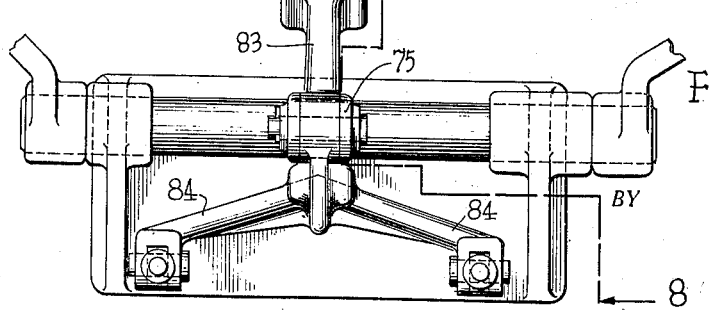
INVENTOR.
CAROLUS L. EKSERGIAN.
BY John P. Tarbox
ATTORNEY.

Patented Mar. 12, 1940

2,192,966

UNITED STATES PATENT OFFICE 2,192,966

BRAKE CONTROL MECHANISM

Carolus L. Eksergian, Detroit, Mich., assignor to Budd Wheel Company, Philadelphia, Pa., a corporation of Pennsylvania Application December 14, 1935, Serial No. 54,415

7 Claims. (Cl. 188—204)

The present invention relates to brake control mechanisms and particularly to such mechanisms for the control of four wheel brakes on automotive vehicles.

Among the objects of the invention are; to provide a brake control mechanism for applying braking force differentially as between the front and rear brakes in a predetermined ratio; to provide an arrangement whereby such predetermined ratio is preserved throughout the braking operation; to provide in such a mechanism an independent connection as between the two front or two rear brakes whereby excessive wear or breakage of one such connection will not substantially alter the operation of the remaining connected brakes, and whereby disadvantages due to friction in the line and difficulties in initial adjustment or setting up, are avoided; and to provide a control mechanism which shall be compact and sturdy, occupying comparatively small space and readily adaptable to different types of vehicles and braking systems.

Other objects and advantages of the invention will be apparent from a perusal of the following specification and the drawings accompanying the same.

In the drawings:

Figure 3 is a perspective diagrammatic view showing the control unit and its connection to the brakes of a vehicle.

Figure 4 is a side view in section on the line 4—4 of Figure 5 but on a larger scale than Figure 5, of a modification.

Figure 5 is a top plan view of the same on a reduced scale.

Figure 6 is a front view of the same, looking at Figure 5 from the bottom of the sheet, and on the same scale.

Figure 7 is a fragmentary front elevation in section on the line 7—7 of Figure 4.

Figure 8 is a side view of a further modification, in section on the line 8—8 of Figure 9 but on a larger scale than Figure 9.

Figure 9 is a front view on a reduced scale, looking at Figure 8 from the left.

Figure 10 is a top plan view in section on the line 10—10 of Figure 8, on the same scale as Figure 9.

Figure 11 is a perspective view of the modification shown in Figures 8 to 10 omitting the bracket and showing the cross rod in section at the surface of the lever carriage.

Figure 2:
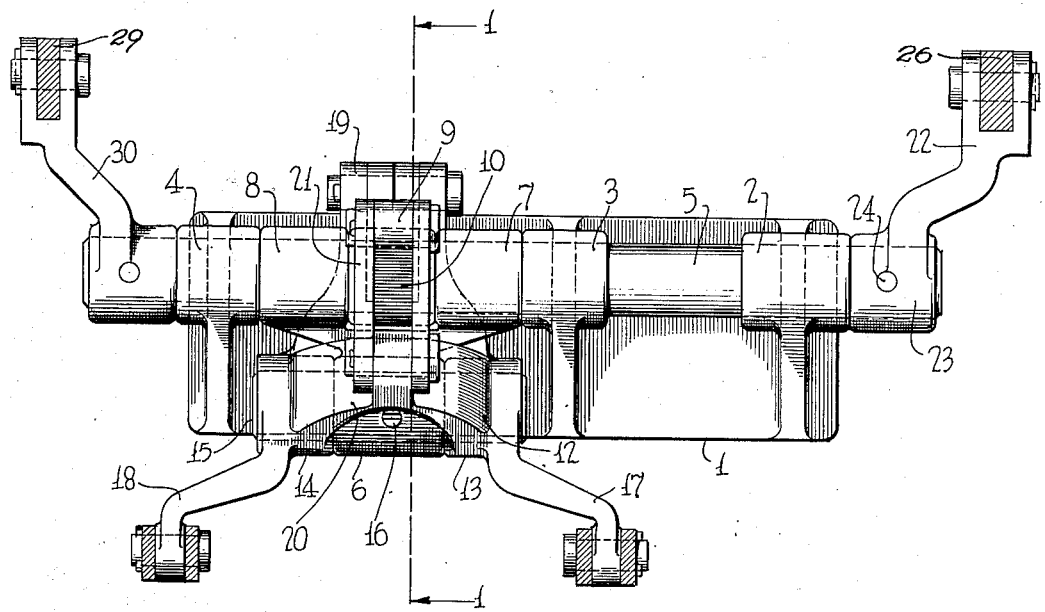
Figure 2 is a front view of the same.

Referring to the drawings in detail, 1 indicates a supporting bracket adapted to be secured to the chassis or frame of an automobile or other vehicle on which the brake mechanism is to be used, which bracket carries a set of axially spaced bearings 2, 3 and 4 in which is journaled a cross-shaft 5. Mounted between the bearings 3 and 4 is a downwardly extending Y-shaped, swinging link member 6 journaled on the cross-shaft 5 through a pair of axially spaced bearings 7 and 8 which at their outer ends about the inner ends of the bracket bearings 3—4. A forwardly extending lever arm 9 is secured on the cross-shaft between the link bearings 7—8 through the collar portion 10 and set screw 11, the collar portion of the arm being of such axial width as to fit in the space between the bearings 7—8 in abutting relation therewith, whereby due to its fixation on the shaft and the abutting relation between the bearings 7—8 and the bracket bearings 3—4, it acts to hold the shaft against axial movement relative to the bracket 1.

A substantially C-shaped multi-lever element 12 is pivotally mounted on the lower end of the link member 6 through axially spaced bearings 13—14 mounted on a short shaft 15 extending through the lower end of the link, the shaft 15 being preferably secured in the link by a set screw 16, while abutment of the inner sides of the bearings 13—14 against the sides of the link holds the multi-lever element 12 against axial movement. However, if desired, the short shaft 15 may be fixed in the lever element 12 and have bearing in the link member.

The function of the multi-link element is to distribute motion in different directions to the front and rear sets of brakes and at a predetermined ratio of leverage or mechanical advantage. To this end the multi-lever element is provided with a pair of relatively short downwardly extending lever arms 17—18 and a relatively long upwardly extending lever arm 19, the radial length of the short arms and that of the long arm having a ratio equal to the desired ratio of forces to be applied to the different sets of brakes. To permit the use of a relatively short depending link 6 and thereby attain compactness, the lever arm 19 is extended around and above the cross-shaft 5 and between the supporting bracket arms of the bearings 3—4. Further in the interest of compactness the driving lever arm 20 of the multi-lever element 12 straddles the lower portion of the Y-shaped link 6 and extends forwardly for connection with the lever arm 9 through the motion transmitting links 21, pivotally connected with the free ends of lever arms 9 and 20 through pivot pins 39 and 40, respectively.

A rocker arm 22 for rocking the cross-shaft 5 is fixed on the shaft through a collar portion 23 and set screw 24. This rocker arm may be operated in any known or other suitable manner as by means of a brake pedal 25 connected thereto through rod 26. A hand brake lever 27 may also be connected for rocking the cross-shaft through the usual lost motion link 28, rod 29 and rocket arm 30.

The present control unit being intended especially for automobiles in which the greater weight distribution is on the front wheels, the control unit is hooked up to the four-wheel brakes of such a vehicle by connecting each of the lower lever arms 17 and 18 with one of the front brakes 31 and 32 directly through tension rods 33 and 34, respectively, and by connecting the working end of the lever arm 19 directly through rods 35 and 36 to the rear brakes 37 and 38, respectively. The mechanism may be biased in the normal position by any known or other suitable spring arrangement, not shown.

Figure 1:
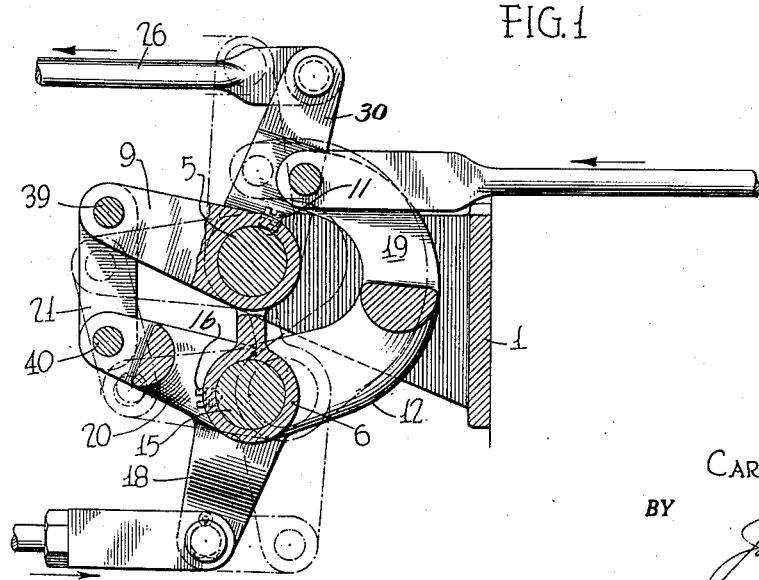
Figure 1 is a side elevation of the brake control mechanism, in section on the line 1—1 of Figure 2.

In operation, when it is desired to apply the brakes, the brake pedal 25 is depressed which pulling on the rod 26 rocks the rocker arm 22 in a counter-clockwise direction (Figs. 1 and 3) and with it the cross-shaft 5. This rocking of the cross-shaft depresses the lever arm 9, which motion is transmitted through linkage 21 and lever arm 20 to the multi-lever element 12, rocking the latter about the stub shaft 15 in a counter-clockwise direction (Figs. 1 and 3), which moves the lower lever arms 17—18 rearwardly and the upper lever arm 19 forwardly with a distribution of force inversely proportional to their respective radial lengths, thus exerting a greater operating force on the front brakes 31—32 than on the rear brakes 37—38.

Because the multi-lever element is free to swing fore and aft with the lower end of the link 6, any variation in the amount of movement of the brake rods necessary to apply the brakes with the ratio of forces determined by the length of the lever arms 17—18 and 19, is compensated for by fore and aft movement of the multi-lever element as a whole, thus maintaining the ratio of braking forces throughout the braking operation and regardless of inequalities of adjustment, lost-motion and the like as between the front and rear brakes, within certain practical limits.

It will be noted that there is no attempt at equalization between the two front brakes or the two rear brakes, individual brake adjustment being relied upon for such equalization. By thus preserving a substantially rigid connection between the control unit and each brake, initial adjustment is simplified and in the event of a failure of one brake rod, substantially normal operation of the remaining brakes is preserved. This latter advantage is attained mainly through the novel compact arrangement of levers with broad bearings balanced against any tendency to twist about a vertical axis. This balancing is attained by shaping and arranging the parts symmetrically with respect to a vertical plane of symmetry coinciding with the vertical, longitudinal plane of symmetry of the arrangement of the four brakes.

A marked advantage attained by mounting the swinging link member 6 to pivot on the shaft 5 which carries the lever arm 9, is that it enables the linkage comprised of the elements 6, 9, 21 and 20 to be arranged to form a parallelogram in all positions of operation and all angular adjustments of the link member 6 about the cross-shaft, whereby the leverage through which motion is transmitted from the cross-shaft to the multi-link member is constant for all positions of operation and angular adjustments of the link 6.

The modification shown in Figures 4 to 7, is functionally substantially the same as the form previously described. Instead of the parallelogram arrangement of levers, it uses a special form of combined oscillating and sliding lever arrangement. Here the supporting bracket 45 carries a pair of bracket bearings 46 and 47 in which is journaled the cross-shaft 48, held in place against lateral movement by the collars 49 and 50 of the rocker arms 51 and 52, respectively, fixed on the shaft by means of suitable set screws 53. Fixed on the cross shaft 48 by means of an anchor pin 54 is a lever-carriage element 55 in which is slidably mounted for movement transverse to the shaft and fore and aft of the vehicle, a multi-lever element 56. The multi-lever element is mounted for such sliding movement on the carriage by means of a pair of spaced rollers 57 carried by the lever element and each having bearing in one of a pair of elongated eyes or slot openings 58 in the lever-carriage 55. The roller bearings 57 are mounted on the lever element 56 by means of bearing shafts in the form of bolts 59 on which the roller bearings 57 have bearing through needle bearings 60.

The multi-lever element 56 is formed in two parts, 56′ and 56″, held together by the bearing bolts 59, the bearing bolts being provided with shoulders 61 (Fig. 7) to suitably space the two sections of the lever element to provide clearance for the lever-carriage 55. To obtain the desired differential braking forces as between the front and rear brakes, the upper lever arm 62 for operating the rear brakes is made longer than the lower lever arms 63 for operating the front brakes, the arm lengths being proportioned according to the ratio of braking forces desired. The upper lever arm 62 has pivotally secured therein a tension rod terminal 64 by means of a pivot bolt 65, while the lower lever arms 63 are similarly provided with rod terminals 66 pivotally mounted therein by pivot bolts 67. The tension rod terminal 64 connects with the rear brake tension rods 68 while the tension rod terminals 63 on the lower lever arms connect with the forward brake rods 69. The rocker arm 52 connects with the usual foot pedal, not shown, through a suitable operating rod 70 pivoted to the rocker arm at 71. The other rocker arm 51 has pivotally connected thereto at 72, an operating rod 73 which may be connected to a suitable hand brake lever through suitable lost motion means not shown.

Any known or other suitable form of biasing means such as a spring or the like, not shown, will be provided for resiliently holding the mechanism in the normal position shown. In the operation of the arrangement shown in Figures 4 to 7, the pull on one of the operating rods, for example 70, acting through the rocker arm 52 will rock the shaft 48 counterclockwise (Figure 4), the lever-carriage 55 rocking with the shaft to rock the lever element 56, moving the upper lever arm 62 forwardly and the lower lever arms 63 rearwardly of the vehicle. The lever arms pulling on their perspective tension rods effect engagement of the front and rear sets of brakes, the fore and aft sliding connection between the lever element and the lever-carriage acting to equalize the difference in motion required by the different sets of brakes. Thereafter further pull on the rocker arm 52 will apply the brakes with a force commensurate with the force applied to the rocker arm.

By moving the axes of the bearings 59 down into the plane of the axis of the cross shaft 48, the pull on the tension rods will be maintained in substantially constant ratio as between the front and rear brakes according to the ratio between the radial lengths of the lower and upper lever arms.

In the modification shown in Figures 8 to 11, the substantially C-shaped multi-liver element 74 is arranged to be mounted wholly within the axial overall dimension of the lever-carriage 75 with the roller bearings 76 carried by the lever-carriage and co-operating with elongated eyes or slots 77 in the lever element. This arrangement enables the lever-carriage 75 to be given any extent of axial dimension desirable, thus enabling it to be given a wide anchorage on the shaft with portions such as the extreme side portions 78—79 wholly surrounding the shaft and spaced well apart axially of the shaft so as to strongly brace the carriage against twisting about a vertical axis, which is of value where equalization as between the two rear brakes or the two front brakes is to be avoided, as in the present case. The advantage of this latter modification is that by making the multi-lever element 74 in the general form of an open circle or C-shaped, assembling and disassembling of the parts on the lever-carriage 75 may be effected without removal of the shaft. This will be clear from an inspection of Figure 11 where it will be seen that when assembling the multi-lever element 74 with its rollers 76 in the elongated outer bearing portions 80, it may be inserted in position between the bifurcated ends of the carriage 75 from the lower left hand side of the rock shaft, bearing pins 81 being then inserted and secured in place to support the roller bearing 76 on the needle bearings 82.

A further advantage of the present form is that multi-lever element 74 may be formed as one solid integral member which makes for sturdiness and strength.

The present form like the two forms previously described, is connected up with the upper lever arm 83 connected to the rear set of brakes and the lower lever arms 84 connected to the front set of brakes. The operation of the latter modification is the same as that described for Figures 4 to 7 except that the upper and lower lever arms being of equal radial length the pull on the front and rear sets of brakes is substantially the same.

While I have herein shown and described certain specific embodiments of the invention for the sake of disclosure, it is to be understood that the invention is not limited to such specific embodiments but contemplates all such variants and modifications thereof as fall fairly within the scope of the appended claims.

What I claim is:

1. Braking mechanism for motor vehicles having sets of front and rear brakes, comprising a cross-shaft, a link pivoted on said shaft, a multi-lever element pivoted on said link below said cross-shaft, brake operating means for one of said sets of brakes pivotally connected to said lever element below the pivotal axis of said element, brake operating means for the other of said sets of brakes pivotally connected to said lever element above said cross shaft, an arm fixed on said cross-shaft, a link connecting said arm with said lever element, and means for rocking said cross-shaft.

2. Braking mechanism for motor vehicles having sets of front and rear brakes, comprising a cross-shaft, a link pivoted on said shaft through a pair of axially spaced bearings, a multi-lever element pivoted on said link below said cross-shaft on an axis parallel to the cross-shaft and through a pair of axially spaced bearings situated on opposite sides of said link, brake operating means for one set of brakes pivotally connected to said lever element below the pivotal axis of said element, at points spaced apart along a line parallel to said cross-shaft, brake operating means for the other set of brakes pivotally connected to said lever element above the cross-shaft, an arm fixed on said cross-shaft between the spaced bearings of the link in a manner to hold the shaft and the link against relative sliding movement, a link connecting said arm with the said multi-lever element, a pair of bearings for said cross-shaft situated at opposite sides of the spaced bearings of said first-mentioned link in juxtaposition thereto to hold the link against axial movement, and means for rocking the cross-shaft.

3. Braking mechanism for motor vehicles having sets of front and rear brakes, comprising a bearing bracket having a pair of axially spaced bearings, a cross-shaft journaled in said bearings, a link pivotally mounted on said shaft through axially spaced bearings situated between said bracket bearings and in juxtaposition thereto to prevent relative axial movement therebetween, a lever arm fixed on said shaft between the axially spaced bearings of said link and in juxtaposition thereto to prevent axial movement of the shaft, a multi-lever element pivoted on the link below the shaft at points axially spaced apart on opposite sides of the link along an axis parallel to the axis of the cross-shaft, a motion-transmitting link connecting the lever arm with said multi-lever element, brake operating means for one of said sets of brakes pivotally connected to said multi-lever element below the pivotal connection of said lever element with said first-mentioned link, brake operating means for the other of said sets of brakes pivotally connected to said multi-lever element at a point above said cross shaft, and means for rocking said cross-shaft.

4. A braking mechanism for motor vehicles having sets of front and rear brakes, comprising a bearing bracket fixed on the vehicle intermediate the front and rear brakes and having a pair of transverse axially spaced bearings, a cross-shaft journaled in said bearings, a downwardly extending link pivotally mounted on said shaft through axially spaced bearing situated between said bracket bearings, a forwardly extending lever arm fixed on said shaft between the spaced bearings of said link, a multi-lever element pivoted on the link below the shaft, a forwardly extending lever arm on said multi-lever element, a motion transmitting link connecting the lever arms at their forward ends, a downwardly extending lever arm on the multi-lever element, an upwardly extending lever arm on said multi-lever element extending rearwardly around and above the cross-shaft, brake operating means pivotally connected one to each of said downwardly extending and upwardly extending levers, and means for rocking said cross-shaft.

5. A brake control unit for motor vehicles having sets of front and rear brakes, comprising a cross-shaft, a swinging link pivoted on said cross-shaft, a multi-lever element pivoted on said link below said cross-shaft, brake operating means for one of said sets of brakes pivotally connected to said lever element, brake operating means for the other of said sets of brakes pivotally connected to said lever element, an arm fixed on said cross-shaft and means for transmitting motion from said arm to said multi-lever element pivotally connected to said arm and multi-lever element; said swinging link with its pivotal connection to the cross-shaft, said multi-lever element and its pivotal connection to the swinging link, said arm and its pivotal connections with the multi-lever element, being arranged as a parallelogram.

6. A brake control unit for vehicles having sets of front and rear brakes, comprising a cross-shaft, a C-shaped multi-lever element mounted to swing about the axis of said cross-shaft without enclosing the same, means restricting the multi-lever element to lineal transverse movement relative to the cross-shaft and maintaining it fixed against rotational movement relative to the cross-shaft, linkage means connecting one arm of said lever element to one of the said sets of brakes, linkage means connecting another arm of said lever element to the other set of brakes, and means for rocking said cross-shaft.

7. A brake control unit for vehicles having sets of front and rear brakes, comprising a horizontal rock shaft mounted transversely of the vehicle, a lever carriage fixed on said shaft, a multi-lever element slidably mounted on said carriage at points spaced apart on opposite sides of said shaft and restricted to sliding movement transverse to the shaft and substantially longitudinal of the vehicle, brake operating means for one set of brakes connected to one arm of the multi-lever element at a point above the rock shaft, brake operating means for the other set of brakes connected to other arms of the multi-lever element at a point below the rock shaft, and means for rocking the rock shaft, the lever arms of said multi-lever element acting on the respective sets of brakes being of different length whereby to exert a differential braking action on the respective sets.

CAROLUS L. EKSERGIAN.